(12) United States Patent
Guo et al.

(10) Patent No.: US 9,811,777 B2
(45) Date of Patent: Nov. 7, 2017

(54) RULE MATCHING METHOD AND APPARATUS FOR DEEP PACKET INSPECTION

(71) Applicant: Huawei Technologies Co., Ltd., Shenzhen, Guangdong (CN)

(72) Inventors: Zhi Guo, Shenzhen (CN); Fuqiang Wu, Shenzhen (CN); Jia Zeng, Shenzhen (CN); Deepak Mansharamani, Santa Clara, CA (US); John Cortes, Shenzhen (CN); Lingyan Sun, Shenzhen (CN); Dan Tian, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 479 days.

(21) Appl. No.: 14/552,052

(22) Filed: Nov. 24, 2014

(65) Prior Publication Data

US 2015/0081612 A1    Mar. 19, 2015

Related U.S. Application Data

(63) Continuation of application No. PCT/CN2013/070434, filed on Jan. 14, 2013.

(30) Foreign Application Priority Data

Aug. 7, 2012 (CN) .......................... 2012 1 0278778

(51) Int. Cl.
*G06F 15/18* (2006.01)
*G06N 5/02* (2006.01)
(Continued)

(52) U.S. Cl.
CPC ........... *G06N 5/027* (2013.01); *H04L 43/028* (2013.01); *H04L 69/12* (2013.01); *G06F 2221/2101* (2013.01)

(58) Field of Classification Search
CPC ................................ H04L 47/20; G06F 9/444
(Continued)

(56) References Cited

U.S. PATENT DOCUMENTS 7,356,663 B2    4/2008  Jain
8,214,305 B1    7/2012  Birman et al.
(Continued)

FOREIGN PATENT DOCUMENTS

CN    101764718 A    6/2010
CN    101841546 A    9/2010
(Continued)

*Primary Examiner* — David Vincent

(57) ABSTRACT

The present invention discloses a rule matching method including: receiving a packet; detecting feature information in content of the packet, and determining whether the detected feature information in the packet conforms to a classification characteristic of one rule group among a plurality of preset rule groups; if yes, determining a state machine corresponding to the one rule group as a first state machine; and determining whether the first state machine is stored in an on-chip memory, and if yes, using the first state machine to match the packet to obtain a matching result; and if no, when an off-chip memory stores the first state machine, loading the first state machine from the off-chip memory into the on-chip memory, and using the first state machine to match the packet to obtain a matching result. Embodiments of the present invention enable a product to achieve better performance.

20 Claims, 14 Drawing Sheets

(51) Int. Cl.
*H04L 12/26* (2006.01)
*H04L 29/06* (2006.01)

(58) Field of Classification Search
USPC .................................................. 706/15, 45
See application file for complete search history.

(56) References Cited

U.S. PATENT DOCUMENTS

| | | | |
|---|---|---|---|
| 2009/0106183 A1 | 4/2009 | Estan et al. | |
| 2010/0040066 A1 | 2/2010 | Hao et al. | |
| 2011/0219010 A1 | 9/2011 | Lim | |
| 2014/0105022 A1* | 4/2014 | Soni | H04L 63/0263 |
| | | | 370/235 |

FOREIGN PATENT DOCUMENTS

| | | |
|---|---|---|
| CN | 102006216 A | 4/2011 |
| CN | 102075430 A | 5/2011 |
| CN | 102148803 A | 8/2011 |
| CN | 102868571 A | 1/2013 |
| EP | 1 547 342 A1 | 3/2004 |

* cited by examiner

| Character information \ Offset | 0 | 1 | 2 | 3 | 4 |
|---|---|---|---|---|---|
| a | 1 | 0 | 1 | 1 | 0 |
| b | 0 | 1 | 1 | 1 | 0 |
| c | 0 | 0 | 1 | 1 | 0 |
| d | 0 | 0 | 1 | 1 | 0 |
| ⋮ | 0 | 0 | 1 | 1 | 0 |
| m | 0 | 0 | 1 | 1 | 0 |
| n | 0 | 0 | 1 | 1 | 1 |
| ⋮ | 0 | 0 | 1 | 1 | 0 |
| s | 0 | 0 | 1 | 1 | 1 |
| t | 0 | 0 | 1 | 1 | 1 |
| ⋮ | 0 | 0 | 1 | 1 | 0 |
| x | 0 | 0 | 1 | 1 | 0 |
| y | 0 | 0 | 1 | 1 | 0 |
| ⋮ | 0 | 0 | 1 | 1 | 0 |

FIG. 7

| Offset Character information | 0 | 1 | 2 | 3 | 4 |
|---|---|---|---|---|---|
| a | 1 | 1 | 0 | 0 | 0 |
| b | 1 | 1 | 0 | 0 | 0 |
| : | 1 | 1 | 0 | 0 | 0 |
| m | 1 | 1 | 1 | 1 | 0 |
| n | 1 | 1 | 1 | 1 | 0 |
| : | 1 | 1 | 0 | 0 | 0 |
| y | 1 | 1 | 0 | 0 | 1 |
| : | 1 | 1 | 0 | 0 | 0 |

FIG. 9

| Offset Character information | 0 | 1 | 2 | 3 | 4 |
|---|---|---|---|---|---|
| a | 0 | 1 | 0 | 0 | 0 |
| b | 0 | 1 | 1 | 0 | 0 |
| : | 0 | 1 | 0 | 0 | 0 |
| x | 1 | 1 | 1 | 1 | 0 |
| y | 0 | 1 | 0 | 0 | 1 |
| : | 0 | 1 | 0 | 0 | 0 |

FIG. 10

RULE MATCHING METHOD AND APPARATUS FOR DEEP PACKET INSPECTION

CROSS-REFERENCE TO RELATED APPLICATIONS

This application is a continuation of International Application No. PCT/CN2013/070434, filed on Jan. 14, 2013, which claims priority to Chinese Patent Application No. 201210278778.X, filed on Aug. 7, 2012, both of which are hereby incorporated by reference in their entireties.

TECHNICAL FIELD

The present invention relates to the field of network technologies, and in particular, to a rule matching method and apparatus.

BACKGROUND

As an enhanced filter for a network device, the DPI (Deep Packet Inspection, deep packet inspection) technology gradually and organically integrates capabilities such as user management, security control, and fine service control, to implement functions such as dynamic awareness, policy control, and QoS (Quality of Service, quality of service) assurance for varied services, and security assurance for networks and services, thereby reducing capital expenditure and operating expenditure of a telecom operator and providing a basic operation platform of telecommunications services for the telecom operator.

A basic principle of the DPI technology includes: detecting certain feature characters in a high-layer protocol (for example, the application layer) in a packet, and then performing matching with a state machine (formed by compiling a rule), determining that the detected feature characters are some predetermined keywords, and performing corresponding processing according to a determination result.

The DPI technology may be implemented based on software or hardware. Software implementation is relatively flexible, but performance is poor (with, for example, a low speed low and a small number of supported rules). In an actual application, to enhance the performance, hardware is generally adopted for implementation in the prior art. For example, a FPGA (Field-Programmable Gate Array, field-programmable gate array) is used for implementation. However, to enable a product to achieve better performance improvement, finding a better method to improve performance is an issue to be solved in the industry.

SUMMARY

Embodiments of the present invention provide a rule matching method and apparatus, to solve an issue existing in the prior art that performance of a product based on the DPI technology still needs to be improved.

To achieve the foregoing purpose, the following technical solutions are adopted in the embodiments of the present invention:

A rule matching method, including:

receiving a packet;

detecting feature information in content of the packet, and determining whether the detected feature information in the packet conforms to a classification characteristic of one rule group among a plurality of preset rule groups, where each rule group in the plurality of rule groups is obtained by grouping one or more rules according to a predetermined classification characteristic, and each rule group after compiling corresponds to one state machine, where the state machine is configured to match the packet, where a state machine commonly used in matching is stored in an on-chip memory with a relatively high read/write speed, and other state machines are stored in an off-chip memory with a relatively low read/write speed; and when the detected feature information conforms to a classification characteristic of one rule group among the plurality of preset rule groups, determining the state machine corresponding to the one rule group as a first state machine; determining whether the first state machine is stored in the on-chip memory, and if yes, using the first state machine to match the packet to obtain a matching result; and if no, when the off-chip memory stores the first state machine, loading the first state machine from the off-chip memory into the on-chip memory, and using the first state machine to match the packet to obtain a matching result.

A rule matching apparatus, including:

a receiving unit, configured to receive a packet;

a detecting unit, configured to detect feature information in the packet received by the receiving unit, and determine whether the detected feature information in the packet conforms to a classification characteristic of one rule group among a plurality of preset rule groups, and send a detection result to a matching unit, where there are a plurality of rule groups which are obtained by grouping one or more rules according to predetermined classification characteristics, and each rule group after compiling corresponds to one state machine and one state machine identifier, where the state machine is configured to match the packet, where a state machine commonly used in matching is stored in an on-chip memory with a relatively high read/write speed, and other state machines are stored in an off-chip memory with a relatively low read/write speed; and the matching unit, configured to determine, when it is learned from the detection result sent by the detecting unit that the feature information detected by the detecting unit conforms to a classification characteristic of one rule group among the plurality of preset rule groups, a state machine corresponding to the one rule group as a first state machine; and determine whether the first state machine is stored in the on-chip memory, and if yes, use the first state machine to match the packet to obtain a matching result; and if no, when the off-chip memory stores the first state machine, load the first state machine from the off-chip memory into the on-chip memory and use the first state machine to match the packet to obtain a matching result.

In the rule matching method and apparatus according to the embodiments of the present invention, rules are grouped, which can avoid a rule explosion problem; a commonly used state machine is stored in an on-chip memory, and the state machine in the on-chip memory is used in priority for matching, thereby reducing a matching time (an on-chip processor has a higher read/write speed) and improving product performance.

BRIEF DESCRIPTION OF THE DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

FIG. 7 is an exemplary diagram of a feature table of rule group 1 generated in the method for grouping rules according to Embodiment 3 of the present invention;

FIG. 9 is an exemplary diagram of a feature table of rule group 2 generated in the method for grouping rules according to Embodiment 3 of the present invention;

FIG. 10 is an exemplary diagram of a feature table of rule group 3 generated in the method for grouping rules according to Embodiment 3 of the present invention;

DETAILED DESCRIPTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Embodiment 1

Figure 1:
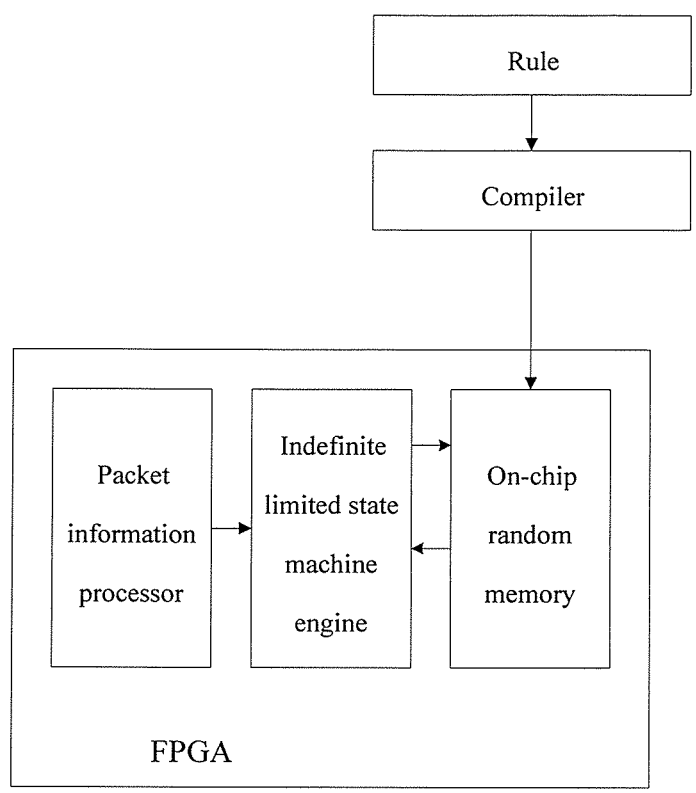
FIG. 1 is a structural diagram of an NFA compiled from a rule in the prior art.
Figure 2:
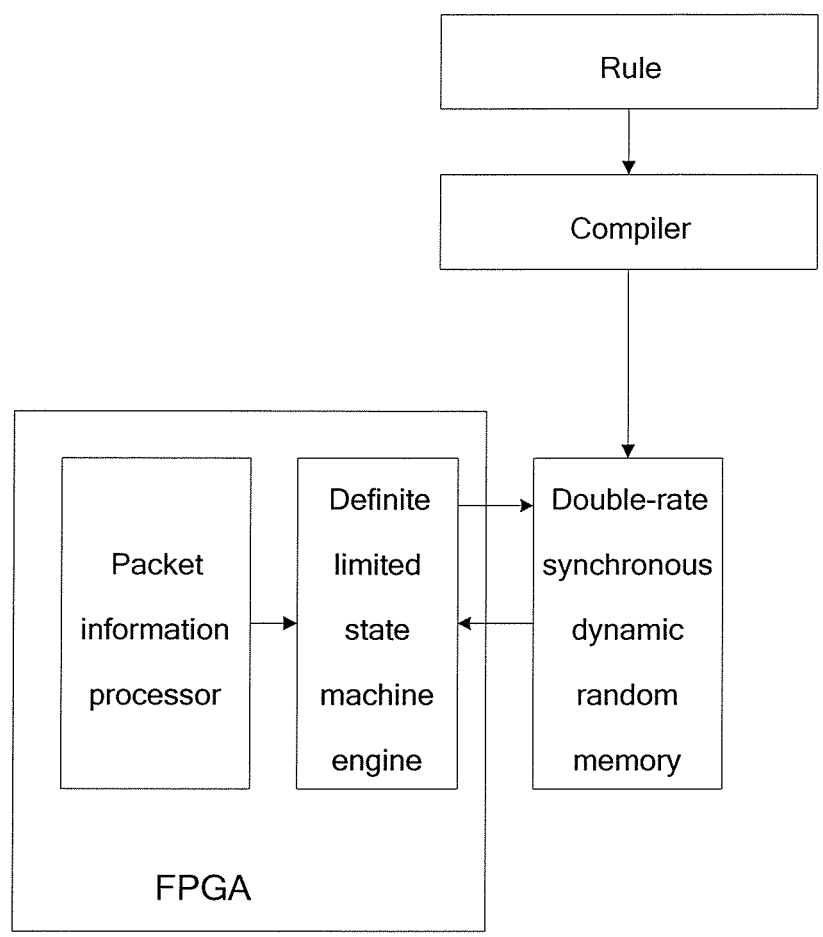
FIG. 2 is a structural diagram of a DFA compiled from a rule in the prior art.
Figure 3:
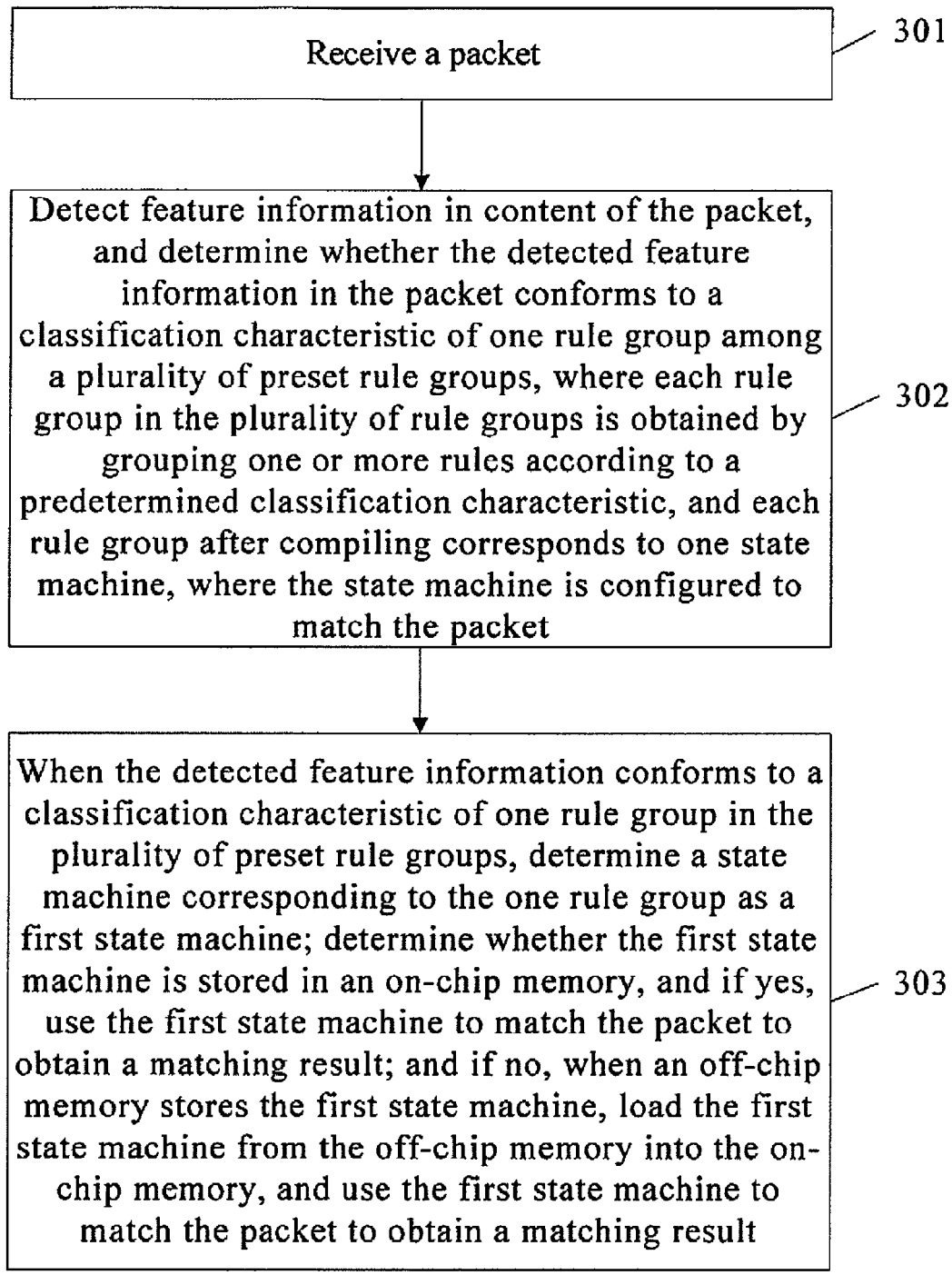
FIG. 3 is a flowchart of a rule matching method according to Embodiment 1 of the present invention.

The embodiment of the present invention provides a rule matching method. As shown in FIG. 3, the method includes the following steps:

301. Receive a packet.

302. Detect feature information in content of the packet, and determine whether the detected feature information in the packet conforms to a classification characteristic of one rule group among a plurality of preset rule groups, where each rule group in the plurality of rule groups is obtained by grouping one or more rules according to a predetermined classification characteristic, and each rule group after compiling corresponds to one state machine, where the state machine is configured to match the packet, where a state machine commonly used in matching is stored in an on-chip memory with a relatively high read/write speed, and other state machines are stored in an off-chip memory with a relatively low read/write speed.

An on-chip memory refers to a memory permanently resides inside a processing chip (for example, a FPGA), with a high read/write speed, and an off-chip memory refers to a memory independent of an internal chip (for example, a DDR SDRAM, Double Data Rate Synchronous Dynamic Random Access Memory, or a Flash memory), with a relatively low read/write speed when compared with an on-chip memory. To achieve better performance, this embodiment preferably selects an FPGA memory as the on-chip memory, and a DDR SDRAM memory as the off-chip memory. If a requirement on the performance is not high, a memory with a relatively low speed, for example, a flash, may be used as the off-chip memory. A memory inside the FPGA chip and the DDR SDRAM are generally volatile memories; therefore, a state machine stored in another storage medium needs to be loaded into these memories at power-on. Then, if the on-chip/off-chip memory is a non-volatile storage medium (for example, when the off-chip memory is a flash memory), the state machine may be stored in the non-volatile storage medium in advance. In step 302, it may be considered that a state machine stored in another storage medium has already been stored in the on-chip/off-chip memory by using a loading process.

303. When the detected feature information conforms to a classification characteristic of one rule group in the plurality of preset rule groups, determine a state machine corresponding to the one rule group as a first state machine; determine whether the first state machine is stored in the on-chip memory, and if yes, use the first state machine to match the packet to obtain a matching result; and if no, when the off-chip memory stores the first state machine, load the first state machine from the off-chip memory into the on-chip memory, and use the first state machine to match the packet to obtain a matching result.

Optionally, the on-chip memory includes two types: one is static, in which content is not updated during program running (referred to as a "static on-chip memory" herein), that is, a state is always stored after being loaded; the other is dynamic, in which content is updated during program running, known as a "cache", that is, content is updated according to a use frequency of the state machine. If certain state machines need to be loaded internally from the off-chip memory, these state machines are updated to the cache; or, if some state machines in the cache are not in use for a long time, these state machines that are not in use for a long time are cleared from the cache.

Based on the on-chip memory architecture, in the embodiment, when it is determined whether the first state machine is stored in the on-chip memory, it is firstly determined whether the first state machine is stored in the static on-chip memory; if yes, it is determined that the first state machine is stored in the on-chip memory; and if no, it is further determined whether the first state machine is stored in the cache; if yes, it is determined that the first state machine is stored in the on-chip memory; and otherwise, it is determined that the first state machine is stored in the off-chip memory. When it is determined that the first state machine is stored in the on-chip memory, the state machine stored in the static on-chip memory or the cache is used for matching. When it is determined that the first state machine is stored in the off-chip memory, the first state machine is loaded from the off-chip memory into the cache for matching.

Certainly, if the on-chip memory has no such architecture, only one determination operation is required, and details are not described herein.

Optionally, in this embodiment, the first state machine may further be used for matching based on a multithreaded technology. For example, the first state machine is used to match one thread of multiple threads, and other state machines are used to match other threads, so as to concurrently execute a plurality of matches to expedite the matching.

In this embodiment, a plurality of rules is grouped according to a same classification characteristic and compiled as a state machine so as to avoid rule explosion; meanwhile, state machines are separately stored in the on-chip and off-chip memories according to use frequencies of the state machines. During a matching process, on-chip state machines are first searched for matching, and then off-chip state machines are searched for matching. In this way, a large capacity storage requirement can be met (the on-chip memory has a large capacity) while a speed requirement is also ensured (the on-chip memory has a high speed), thereby better improving product performance.

Embodiment 2

In Embodiment 1, each rule group in a plurality of rule groups is obtained by grouping one or more rules according to a predetermined classification characteristic. For such grouping, a plurality of rules may be used. This embodiment describes in detail one specific rule grouping method and a corresponding detection method based on the grouping method. It should be noted that the grouping method and the detection method based on the grouping method are not limited to an application scenario of Embodiment 1, which may further be applied to other scenarios where grouping and detection are required, that is, this embodiment may exist independently and solve a corresponding technical problem, and is not necessarily dependent on Embodiment 1.

Figure 4:
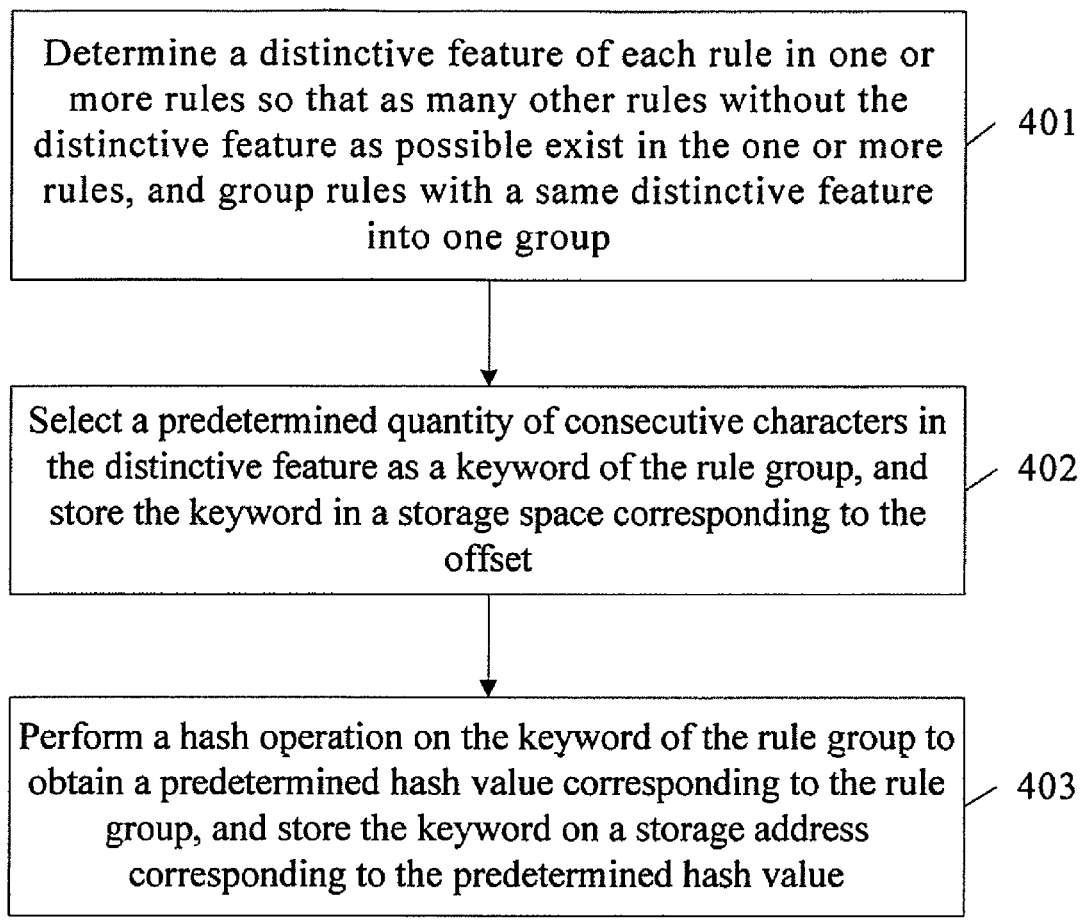
FIG. 4 is a flowchart of a method for grouping rules in a rule matching method according to Embodiment 2 of the present invention.

As shown in FIG. 4, the embodiment groups one or more rules into a plurality of rule groups according to predetermined classification characteristics and includes the following steps:

401. Determine a distinctive feature of each rule in one or more rules so that as many other rules without the distinctive feature as possible exist in the one or more rules, and group rules with a same distinctive feature into one group, where the distinctive feature is one or more consecutive characters with a predetermined quantity starting from an offset.

If there is only "one" rule, apparently, one independent group can be formed. For ease of description, this exception and a case of "a plurality of rules" are described together. In the case of "one" rule, "other rules" in this step may be understood as no rule.

The foregoing solution may also be understood that one or more rules with different distinctive features by comparing with as many other rules as possible are grouped into one group, where the distinctive feature is one or more consecutive characters with a predetermined quantity starting from an offset.

A specific implementation how the distinctive feature is determined so that as many other rules without the distinctive feature as possible exist in the one or more rules and how rules with a same distinctive feature are grouped into one group is a technology commonly known to persons skilled in the art, that is, a person skilled in the art may easily implement the result by a technical means. For example, a distinctive feature of one rule may be determined, and then other rules are traversed as so to determine whether they have the feature. If none of the rules has the feature, apparently, the requirement "so that as many other rules without the distinctive feature as possible exist in the one or more rules" can be met, and rules with the distinctive feature may be separately grouped into one group. If other rules also have the distinctive feature, another distinctive feature is used, for example, another offset or predetermined quantity of consecutive characters. If other rules still have the distinctive feature, it is only necessary to determine a distinctive feature so that "as many as possible" other rules without the distinctive feature exist in the one or more rules. For example, there are four rules in total, and rule 1 has three distinctive features. For distinctive feature 1 of rule 1, two rules without distinctive feature 1 exist in other rules; for distinctive feature 2 of rule 1, two rules without distinctive feature 2 exist in other rules; for distinctive feature 3 of rule 1, one rule without distinctive feature 3 exists in other rules. In this case, distinctive feature 1 or 2 may be selected as a basis for grouping.

In addition to the foregoing distinctive feature determining method with an initial value determined preceding a traverse, a person skilled in the art may further use other algorithms to implement final determination of the distinctive feature and grouping of rule groups, and details are not described herein. Only the final grouping result is described, that is, if a rule has a unique distinctive feature when compared with as many other rules as possible (for example, all other rules), the rule is separately grouped into a group.

For example, it is assumed that the predetermined quantity of consecutive characters in the distinctive feature is 2, and the offset starts from 0, and it is also assumed that there are four rules as follows:

Rule 1: Abcce;
Rule 2: Abced;
Rule 3: Bbcde; and
Rule 4: Bbced.

It can be seen that, in rule 1, two consecutive characters starting from offset 2 are "cc", which are different from other two consecutive characters starting from the offset in other rules (in rule 2, they are "ce"; in rule 3, they are "cd"; and in rule 4, they are also "cd"). Therefore, rule 1 may be separately grouped into one group, because rule 1 has a different distinctive feature when compared with all other rules, which conforms to the "as many as possible" principle.

If a rule that has a different distinctive feature when compared with all other rules (assume that the other rules are N rules in total) is not found, "as many as possible" means a step back to find a different distinctive feature when compared with other N−1 rules.

For example, for the foregoing four rules, it can be seen that rule 2 does not have the distinctive feature when compared with other three rules (two characters starting from offset 0 are "ab", which are the same as those in rule 1; two characters starting from offsets 1, 2 and 3 are respectively "bc", "ce" and "ed", which are the same as the characters in rules 3, 4 and 4). Therefore, take a step back to find the distinctive feature different from other two rules (originally, there are three rules, and now one rule is subtracted). For example, two characters "ce" starting from offset 2 in rule 2 are the same as the two characters in the corresponding offset in rule 4, which are different from those in rules 1 and 3; therefore, this can be used as the distinctive feature of rule 2, and rule 2 is grouped into a rule group. It should be noted that, at this time, another rule may have the distinctive feature. For example, in rule 4, two characters starting from offset 2 are also "ce"; therefore, rules 4 and 2 may be grouped into one group.

In short, the grouping principle in this embodiment is to group certain rules with a "unique" distinctive feature into one group whenever possible, where "unique" preferably means that other rules do not have the distinctive feature. If the condition is not met, the restriction may be loosened, and a "unique as much as possible" distinctive feature may be selected, that is, the fewer other rules with the distinctive feature, the better. It should be noted that the foregoing method is a preferred method. In an actual application, it is acceptable if one or more rules do not meet the strict "unique" requirement (for example, a distinctive feature different from all other rules is not searched at the beginning, but a distinctive feature different from all rules subtracted by one rule is searched), which can be considered as an equivalent implementation means.

402. Select a predetermined quantity of consecutive characters in the distinctive feature as a keyword of the rule group, and store the keyword in a storage space corresponding to the offset.

When a plurality of distinctive features exists in the one or more rules, select the predetermined quantity of consecutive characters in one distinctive feature among the plurality of distinctive features as the keyword of the rule group, where the number of keywords stored in a storage space corresponding to an offset of the selected one distinctive feature is as small as possible, compared with keywords stored in storage spaces corresponding to offsets in other distinctive features than the one distinctive feature among the plurality of distinctive features.

For example, if the rule group has a distinctive feature at offset 0 and a distinctive feature at offset 3, when a storage space of offset 0 is smaller than a storage space of offset 3, the distinctive feature at offset 3 is used as the keyword of the rule group.

403. Perform a hash operation on the keyword of the rule group to obtain a predetermined hash value corresponding to the rule group, and store the keyword in a storage address corresponding to the predetermined hash value, where the predetermined hash value and the storage address conform to a predetermined correspondence.

Figure 5:
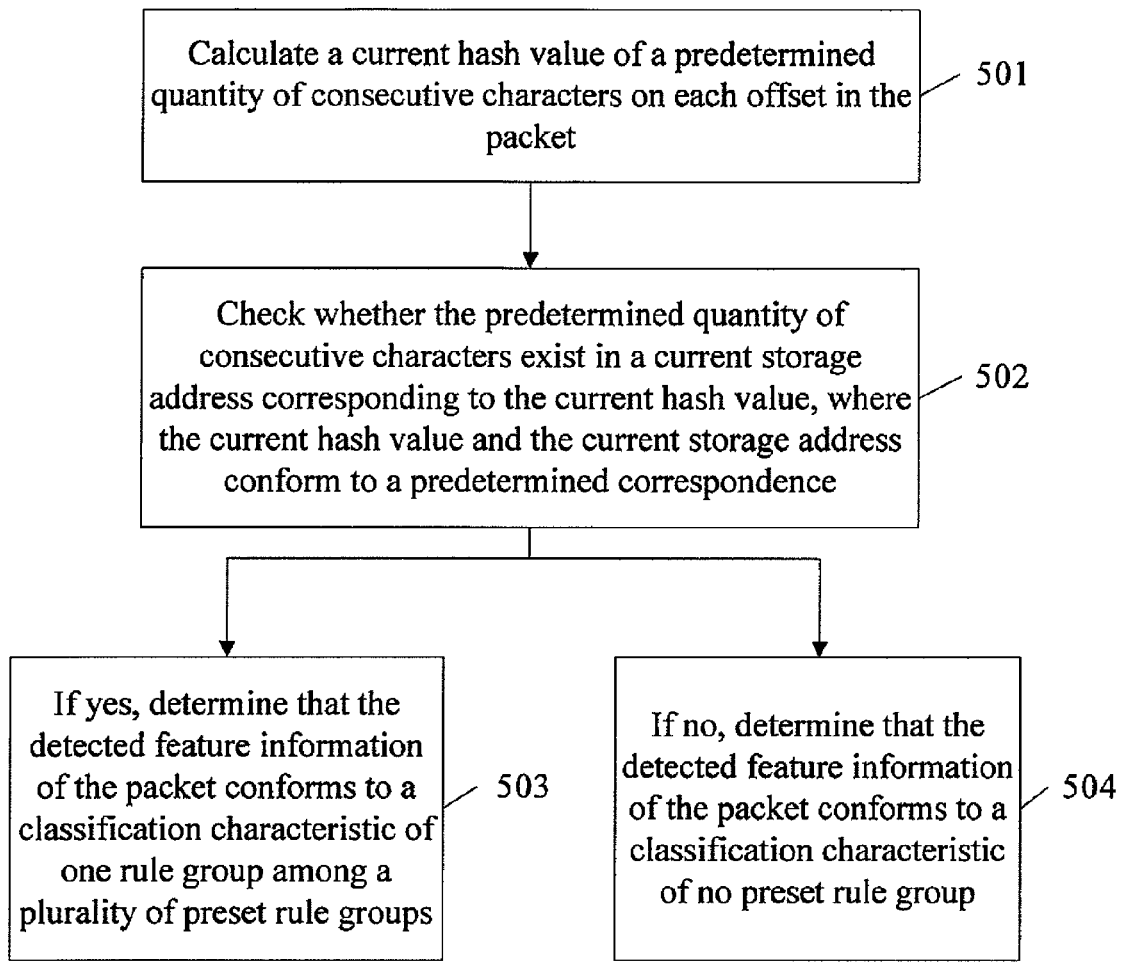
FIG. 5 is a flowchart of a detection method corresponding to the grouping method shown in FIG. 4 according to Embodiment 2 of the present invention.

As shown in FIG. 5, based on the foregoing rule group classification method, the corresponding "detecting feature information in content of the packet, and determining whether the detected feature information in the packet conforms to a classification characteristic of one rule group among a plurality of preset rule groups" includes the following steps:

501. Calculate a current hash value of the predetermined quantity of consecutive characters on each offset in the packet.

502. Check whether the predetermined quantity of consecutive characters exists in a current storage address corresponding to the current hash value, where the current hash value and the current storage address conform to the predetermined correspondence.

503. If yes, determine that the detected feature information in the packet conforms to a classification characteristic of one rule group among the plurality of preset rule groups.

504. If no, determine that the detected feature information in the packet conforms to a classification characteristic of no preset rule group.

In this embodiment, which state machine is used to match a packet can be quickly determined according to feature information in the packet by using a particular grouping method and a hash table-based searching method.

Embodiment 3

This embodiment describes in detail another specific rule grouping method and a corresponding detection method based on the grouping method. Similar to Embodiment 2, the grouping method and the detection method based on the grouping method are not limited to an application scenario of Embodiment 1, which may further be applied to other scenarios where the grouping and detection need are required, that is, this embodiment may exist independently and solve a corresponding technical problem, and is not necessarily dependent on Embodiment 1 or 2.

Figure 6:
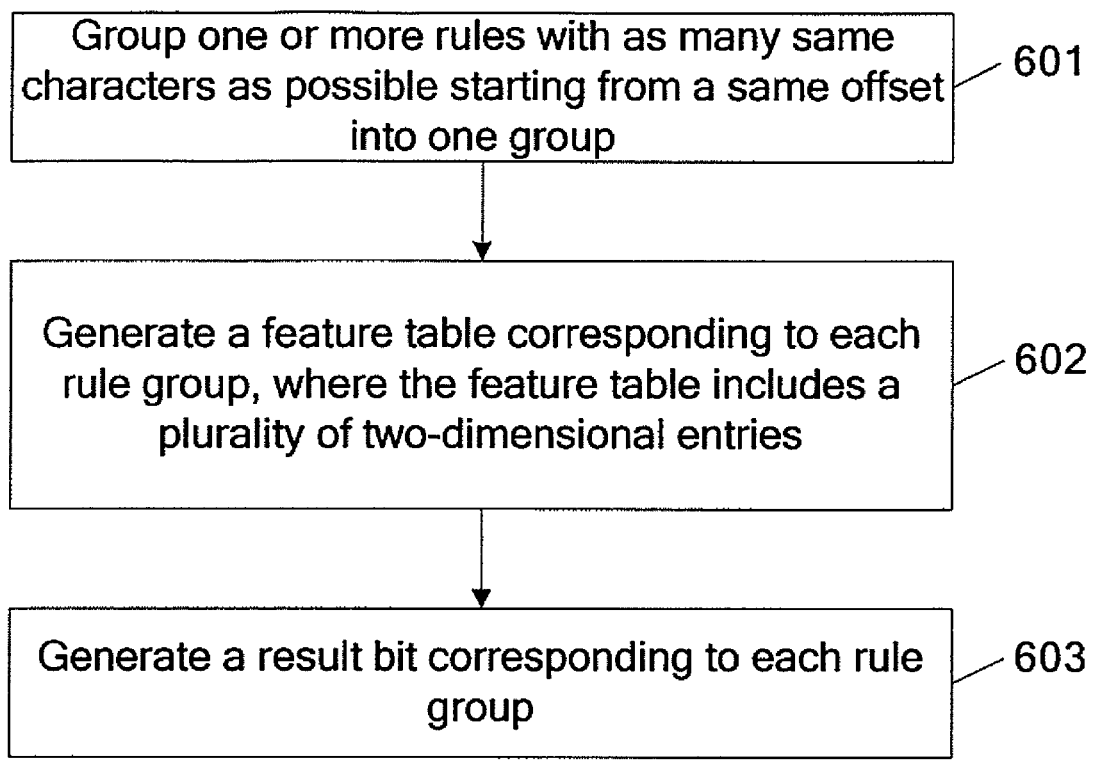
FIG. 6 is a flowchart of a method for grouping rules in a rule matching method according to Embodiment 3 of the present invention.

Referring to FIG. 6, the specific grouping method and some other preprocessing steps based on the grouping method are as follows:

601. Group one or more rules with as many same characters as possible starting from a same offset into one group.

Optionally, before the grouping, group rules according to whether the rules are of a protocol type and/or whether the rules are hot rules, to obtain one or more rule sets, and then group one or more rules with as many same characters as possible starting from a same offset in rules included in each rule set into one group.

For example, if a protocol rule in protocol identification is TCP/UDP (Transmission Control Protocol/User Datagram Protocol, Transmission Control Protocol/User Datagram Protocol), whether it is a hot rule of the device is checked. The hot rule is a rule that is often matched.

For an obtained rule group, it needs to ensure that a space occupied by a state machine that is generated by compiling does not exceed a preset value, and the preset value is a space ultimately occupied by the state machine in an off-chip memory.

When rules are grouped, one or more rules with as many same characters as possible starting from a same offset are grouped into one group. Where, the as many same characters as possible means that rules with as many as same consecutive characters starting from a same offset are grouped into one group. The following are an example of the rules:

Rule 1: .abcd
Rule 2: .abcdmn
Rule 3: .abmn
Rule 4: . . . abcd

Where, character information is all a, b, c, and d at offsets 1 to 4 in rules 1 and 2. Rule 4 has the same character information as rule 1, but not at a same offset. In addition, although rule 3 and rules 1 and 2 have the same character information a and b at offsets 1 and 2, based on the principle of as many same characters as possible, rules 1 and 2 are grouped into one group, rule 3 is grouped into another group, and rule 4 is grouped into another group.

A character COMMON_CHAR (common character) that frequently occurs in the whole rule set, for example, 0x00 in protocol identification, needs to be specially processed in grouping, that is, a case should be avoided that the COMMON_CHAR exists in each position of many groups.

In addition, after the grouping, some relatively small rule groups or rule groups with similar classification characteristics may be merged so as to reduce the number of rule groups and to decrease a size of a feature table corresponding to each rule group generated in step 602.

602. Generate a feature table corresponding to each rule group, where the feature table includes a plurality of two-dimensional entries and each two-dimensional entry includes an offset and a character; when a rule in the rule group has a specific character at a specific offset, set a value of a two-dimensional entry corresponding to the specific offset and the specific character to a valid value; and when no rule in the rule group has a specific character at a specific offset, set a value of a two-dimensional entry corresponding to the specific offset and the specific character to an invalid value.

Specifically, a specific implementation form of a two-dimensional entry may be a two-dimensional array. For example, the feature table below is defined:

table [0] ['a']
table [0] ['b']
. . .
table [0] ['A']
. . .

Where, table [0] ['a'] is a two-dimensional entry and table is an entry name that can be custom-defined; the two-dimensional entry includes an offset (0) and a character (a); for ease of representation, herein, 'a' indicates a value after the character a is converted into an ASC II code. However, actually, the ASC II code still corresponds to the character a, that is, it can still be considered that the two-dimensional data includes the character a.

Referring to FIG. 7, for ease of representation, the embodiment uses a two-dimensional diagram to represent a logical feature table. As shown in FIG. 7, the horizontal axis represents offset information (counted from 0) and the vertical axis represents character information. Each grid at a crossing of the horizontal axis and the vertical axis is equivalent to the foregoing two-dimensional entry, and the value of each crossing grid is a value corresponding to the two-dimensional entry. For example, in the second grid counting from the left (counted from 1) labeled as 1 in the second row in FIG. 7, a corresponding character is b because a corresponding offset in the horizontal axis is 1; therefore, the crossing grid is equivalent to table [1] ['b'], and the value corresponding to the entry is 1.

FIG. 7 shows a total of five offsets ranging from 0 to 4. Actually, a length of each rule is different and the offset is also different, which is not limited herein. Likewise, the number of characters in the vertical axis is not limited. Actually, characters of all ASC II codes are generally included. However, if only a part of characters are used in an actual application, only this part of characters may be included.

As shown in FIG. 7, each crossing grid (two-dimensional entry) needs to correspond to one valid value or invalid value. For ease of representation, 1 represents a valid value and 0 represents an invalid value in this embodiment. The criterion of filling is to check whether a rule in the rule group has a specific character at a specific offset. If yes, 1 is filled; otherwise, 0 is filled. For example, FIG. 7 illustrates a feature table corresponding to a rule group. The rule group includes three rules: abc.s, abxyt and ab.mn. For the two-dimensional entry table [0] ['a'], rule 1 (abc.s) has a character a at an offset 0; therefore, table [0] ['a'] is set to 1, that is, the crossing grid with 0 in the horizontal axis and a in the vertical axis shown in FIG. 7 is set to 1. It should be noted that herein the crossing grid is set to 1 according to rule 1. In practice, the value corresponding to a two-dimensional entry with an offset 0 and a character 0 may also be set to 1 by using rule 2 or rule 3, because all characters at the offset 0 in these rules are a, that is, so long as there is a rule meeting the condition, the two-dimensional entry table [0] ['a'] may be set to 1.

Likewise, the value of the two-dimensional entry table [2] ['c'] with an offset 2 and a character c is also 1; and the value of the two-dimensional entry table [2] ['x'] with an offset 2 and a character x is also 1. In the three rules, no one has an offset 1 and a character a (the character at the offset 1 in all the three rules is b); therefore, the value corresponding to the two-dimensional entry table [1] [a] is 0, that is, the value of the crossing grid with 1 in the horizontal axis and b in the vertical axis in FIG. 7 is 1.

In addition, certain wildcards may appear in a rule. For example, '.' may indicate matching of any character. For the rule abc.s, a wildcard '.' exists at a position where the offset is 3, that is, any character may be allowed at this offset position. Therefore, all two-dimensional entries (for example, table [3] ['a'], table [3] ['b'], table [3] ['c'] . . . ) corresponding to the offset are set to 1.

603. Generate a result bit corresponding to each rule group.

Figure 8:
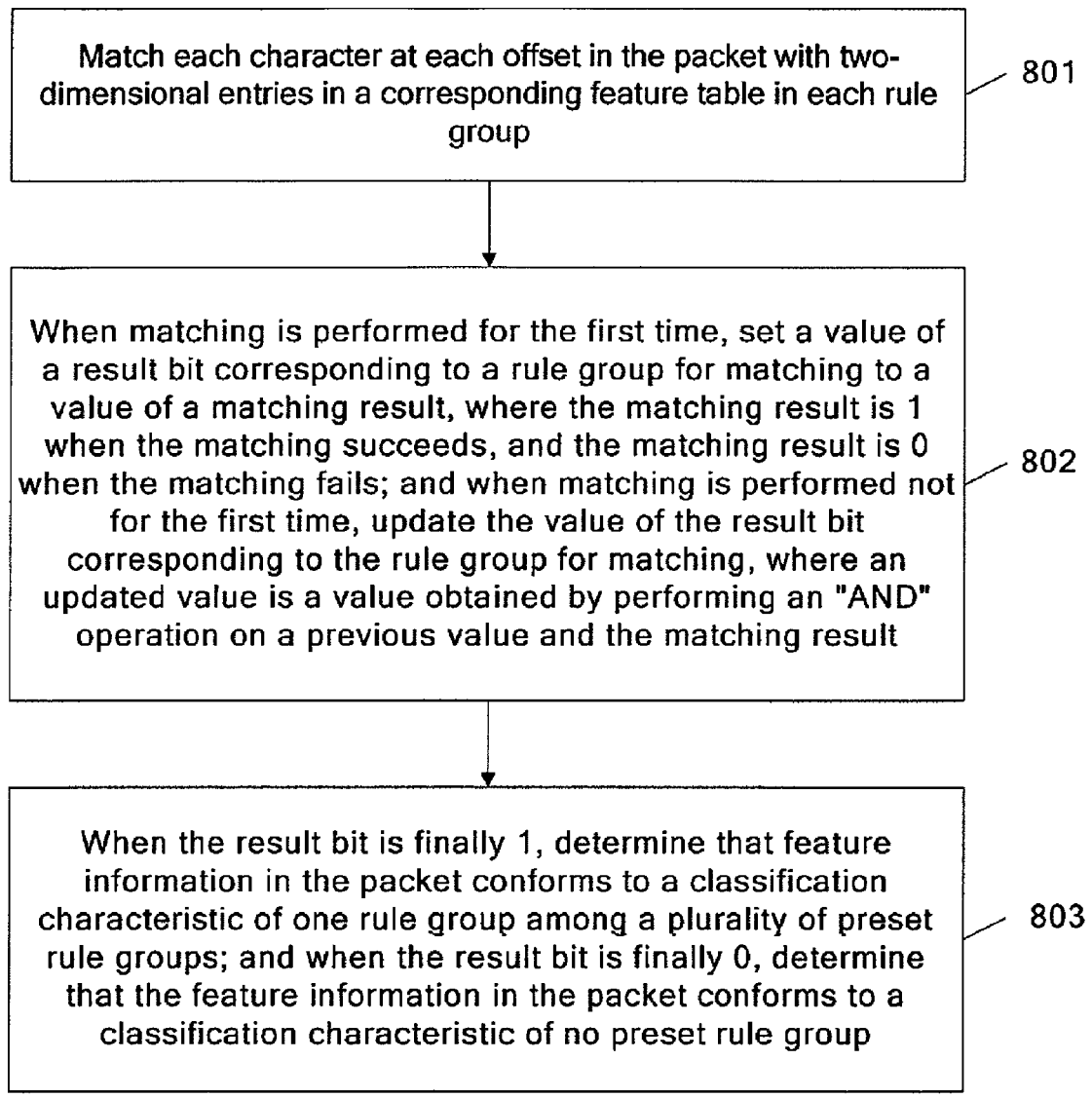
FIG. 8 is a flowchart of a detection method corresponding to the grouping method shown in FIG. 6 according to Embodiment 3 of the present invention.

Based on the foregoing rule group classification method and some preprocessing steps (for example, 602), referring to FIG. 8, the corresponding "detecting feature information in content of the packet, and determining whether the detected feature information in the packet conforms to a classification characteristic of one rule group among a plurality of preset rule groups" includes the following steps:

801. Match each character at each offset in the packet with the two-dimensional entries in the feature table corresponding to each rule group; if a value of a two-dimensional entry that includes a current offset and a current character is valid, the matching succeeds; and otherwise, the matching fails.

802. When matching is performed for the first time, set a value of a result bit corresponding to the rule group for matching to a value of the matching result, where the matching result is 1 when the matching succeeds, and the matching result is 0 when the matching fails; when matching is performed not for the first time, update the value of the result bit corresponding to the rule group for matching, where an updated value is a value obtained by performing an "AND" operation on a previous value and the matching result.

803. When the result bit is finally 1, determine that the feature information in the packet conforms to a classification characteristic of one rule group among the plurality of preset rule groups; and when the result bit is finally 0, determine that the feature information in the packet conforms to a classification characteristic of no preset rule group.

The following describes a specific example.

For example, the character information of the packet is "tamny", rules in rule group 1 are "abc.s", "abxyt", and "ab.mn", where a feature table is shown in FIG. 7; rules in rule group 2 are "mny" and "stmny", where a feature table is shown in FIG. 9; and rules in rule group 3 are "xxxxy" and "x.bxy", where a feature table is shown in FIG. 10. The packet "tamny" is matched with character information at a corresponding offset in the feature tables corresponding to the foregoing three rule groups. Each rule group respectively corresponds to one generated result bit. A specific process is as follows:

a) Match each character at each offset in the packet with two-dimensional entries in a rule group.

That is, for "tamny" in the packet, a character at each offset is matched with each rule group. One-to-one matching or one-to-three matching may be performed.

If a value of a two-dimensional entry that includes a current offset and a current character is valid, it is considered that the matching succeeds. Otherwise, the matching fails. For example, the character at offset 0 is t. Among all rules, only the value corresponding to the two-dimensional entry table2 [0] ['t'] in rule group 2 is a valid value (1); therefore, it is considered that the matching succeeds. If the value corresponding to the two-dimensional entry table2 [0] [t'] in rule group 2 is invalid, it is considered that the matching fails.

b) When matching is performed for the first time, set a result bit of the rule group for matching to the value of the matching result, where when the matching succeeds, the matching result is 1; and when the matching fails, the matching result is 0.

For the packet "tamny", the first matching may start from t with the offset 0. The value corresponding to tablet [0] ['t'] in rule group 2 is 1; therefore, it is considered that the matching succeeds and the matching result is 1. The value of the result bit corresponding to rule group 2 is set to the matching result value, that is, bit2=1. Otherwise, values corresponding to table1 [0] ['t'] and table3 [0] ['t'] are 0; therefore, it is considered that the matching fails, and the matching result is 0. Bits, bit1 and bit3, corresponding to rule groups 1 and 3 are separately set to 0.

c) When matching is performed not for the first time, update the value of the result bit of the rule group for matching, where the updated value is a value obtained by performing an AND operation on the previous value and the matching result.

For example, if the character with the offset 1 is a in the packet and the value corresponding to the two-dimensional entry table2[1] ['a'] in rule group 2 is 1, the matching succeeds and the matching result is 1. Therefore, the result bit bit2 corresponding to rule group 2 is updated. The updated value is the value obtained by performing an AND operation on the previous value (1) and the matching result (1), that is, the result obtained by performing an AND operation on 1 and 1 is still 1. Therefore, the updated value of bit2 is 1. For bit1, the value corresponding to table1[1] ['a'] is 0, the matching fails, and the matching result is 0; after an AND operation on 0 and the previous bit value 0, the final result of bit1 is 0. For bit3, the value corresponding to table3[1] ['a'] is 1, and the matching result is 1; after an AND operation on 1 and the previous bit value 0, the final result of bit3 is 0.

After a plurality of AND operations, the final result of the result bit is checked. If the bit is 1, it is considered that the result conforms to the classification characteristic. Otherwise, if the bit is 0, it is considered that the result does not conform to the classification characteristic.

Figure 11:
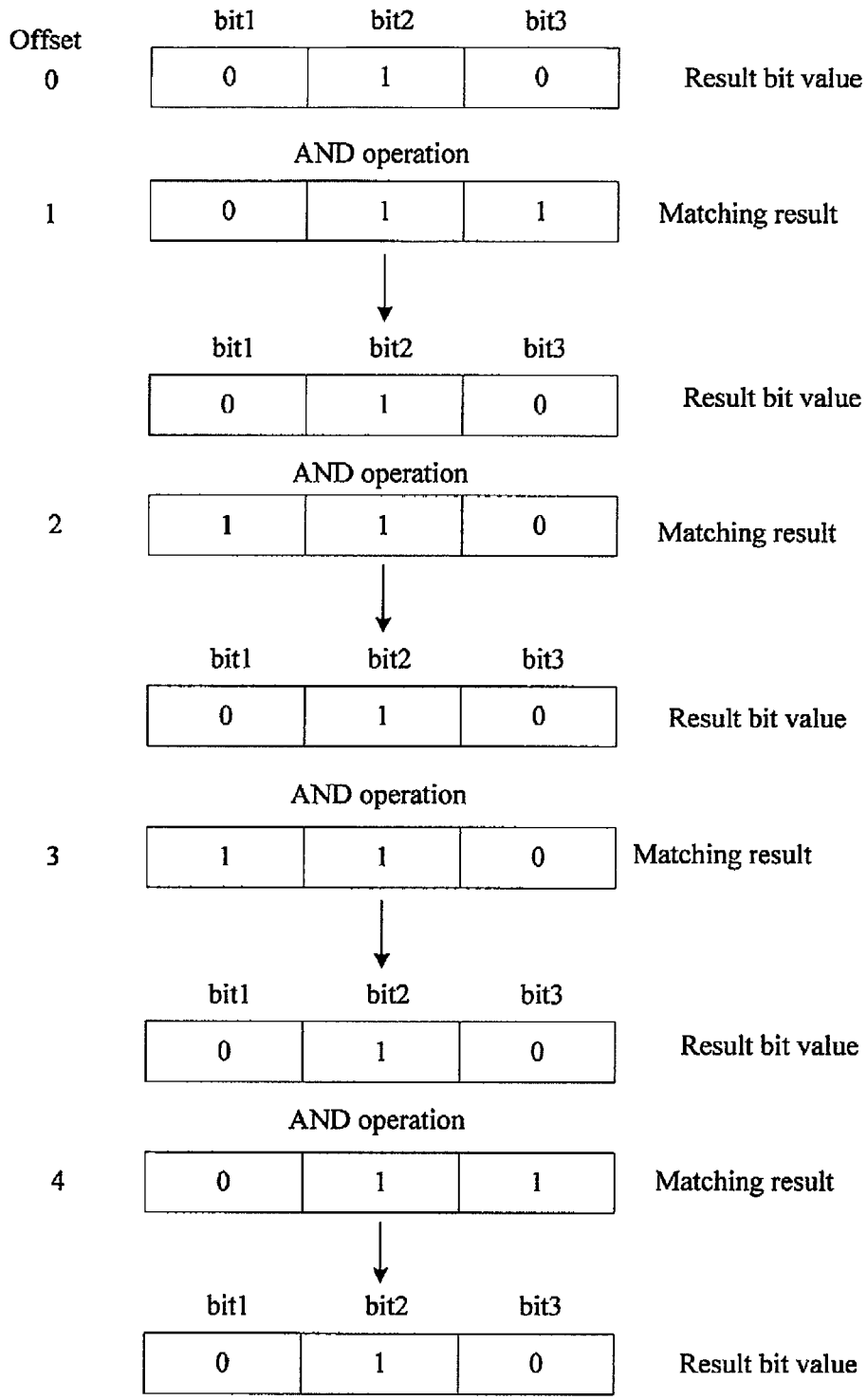
FIG. 11 is an exemplary diagram of logic and an operation result in the rule matching method according to Embodiment 3 of the present invention.

Refer to FIG. 11, which is a schematic diagram of changes of result bits in the matching procedure in the foregoing example. Rule groups 1, 2, and 3 respectively correspond to bit1, bit2, and bit3 in the diagram.

When the offset is 0, t in the packet "tamny" does not match rule group 1 or 3, but matches rule group 2. Therefore, bit1 and bit3 are set to 0, and bit2 is set to 1.

When the offset is 1, a in the packet "tamny" does not match rule group 1, but matches rule groups 2 and 3. The matching results are 011. The updated result bits are 010 after an AND operation with the previous result bits 010.

When the offset is 2, m in the packet "tamny" matches rule groups 1 and 2, but does not match rule group 3. The matching results are 110. The updated result bits are 010 after an AND operation with the previous result bits 010.

The foregoing calculation is performed sequentially. Finally, the result bits are 010, that is, bit1=0, bit2=1, and bit3=0, which means that the feature information in the packet conforms to the classification characteristic of rule group 2, does not conform to the classification characteristic of rule group 1 or 3.

It should be noted that the foregoing implementation manner of bit operation is not unique. A person skilled in the art may perform an operation on a plurality of result bits at one time, as shown in FIG. 11, or perform operations on these result bits separately. In addition, a person skilled in the art may also easily note that, because the final result is definitely 0 after an AND operation on a bit, no matter 0 or 1, with 0. Therefore, if the matching result has a 0, the final result of the result bit may be directly set to 0. These manners or other similar manners may be deemed as equivalent manners of this embodiment. According to this embodiment, result bits corresponding to the rule groups can be processed uniformly, which facilitates software implementation.

In this embodiment, which state machine is used to match a packet can be quickly determined according to feature information in the packet by using a particular grouping method and a bit-based operation.

Embodiment 4

Figure 12:
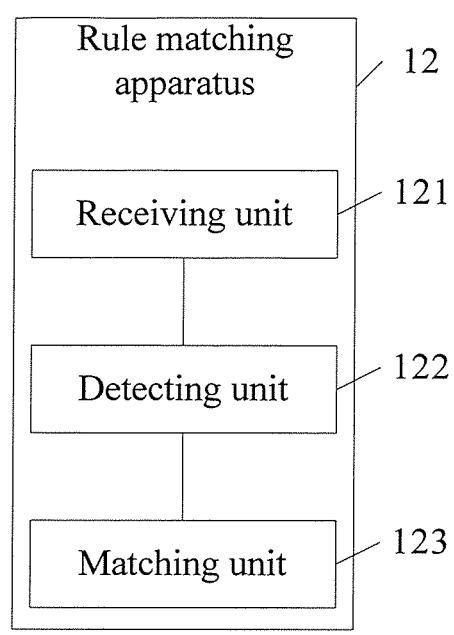
FIG. 12 is a structural diagram of a rule matching apparatus according to Embodiment 4 of the present invention.

Based on the foregoing embodiments, this embodiment provides a rule matching apparatus 12 to execute the method process of each foregoing embodiment. As shown in FIG. 12, the apparatus includes:

a receiving unit 121, configured to receive a packet;

a detecting unit 122, configured to detect feature information in the packet received by the receiving unit 121, and determine whether the detected feature information in the packet conforms to a classification characteristic of one rule group among a plurality of preset rule groups, and send a detection result to a matching unit, where there are a plurality of rule groups which is obtained by grouping one or more rules according to predetermined classification characteristics, and each rule group after compiling corresponds to one state machine and one state machine identifier, where the state machine is configured to match the packet, where a state machine commonly used in matching is stored in an on-chip memory with a relatively high read/write speed, and other state machines are stored in an off-chip memory with a relatively low read/write speed; and a matching unit 123, configured to determine, when it is learned from the detection result sent by the detecting unit that the feature information detected by the detecting unit 122 conforms to a classification characteristic of one rule group among the plurality of preset rule groups, a state machine corresponding to the one rule group as a first state machine; and determine whether the first state machine is stored in the on-chip memory, and if yes, use the first state machine to match the packet to obtain a matching result; and if no, when the off-chip memory stores the first state machine, load the first state machine from the off-chip memory into the on-chip memory and use the first state machine to match the packet to obtain a matching result.

In this embodiment, the detecting unit and the matching unit may be specifically implemented based on an FPGA, where an on-chip memory uses a memory embedded in the FPGA and an off-chip memory uses a DDR SDRAM so as to achieve better performance. How to implement the foregoing functional modules based on an FPGA is a technology commonly known to persons skilled in the art, which is not described herein.

Embodiment 5

Figure 13:
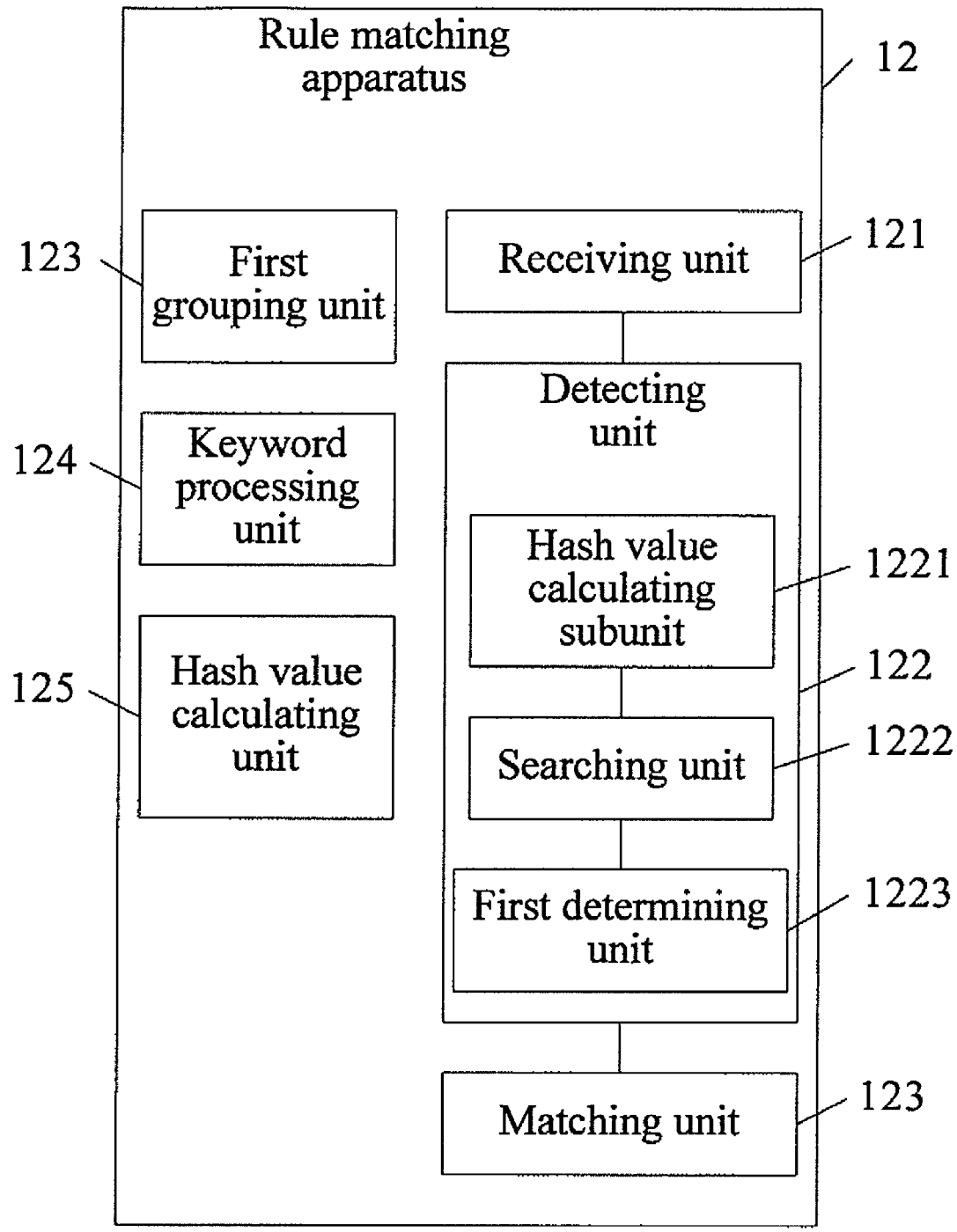
FIG. 13 is a structural diagram of another rule matching apparatus according to Embodiment 5 of the present invention.

Based on Embodiment 4, as shown in FIG. 13, the rule matching apparatus 12 in this embodiment further includes a first grouping unit 123, configured to determine a distinctive feature of each rule in one or more rules so that as many other rules without the distinctive feature as possible exist in the one or more rules, and group rules with a same distinctive feature into one group, where the distinctive feature is one or more consecutive characters with a predetermined quantity starting from an offset.

Functions of the first grouping unit may be implemented based on an existing compiler.

The rule matching apparatus 12 in this embodiment may further include:

a keyword processing unit 124, configured to select a predetermined quantity of consecutive characters in the distinctive feature as a keyword of the rule group and store the keyword in a storage space corresponding to the offset;

where, this unit may also be implemented based on an existing compiler; the storage space is an on-chip storage space; and if an on-chip memory is volatile, the keyword may be stored in another medium in advance, and then copied to the on-chip memory in the time of running, where space addresses generated in advance and addresses finally copied to the on-chip storage space are in a one-to-one correspondence; and a hash value calculating unit 125, configured to perform a hash operation on the keyword of the rule group obtained by the keyword processing unit 124 by processing, to obtain a predetermined hash value corresponding to the rule group, and store the keyword in a storage address corresponding to the predetermined hash value, where the predetermined hash value and the storage address conform to a predetermined correspondence; and specifically, the unit may be implemented based on an FPGA.

The detecting unit 122 specifically includes:

a hash value calculating subunit 1221, configured to calculate a current hash value of the predetermined quantity of consecutive characters on each offset in the packet;

a searching unit 1222, configured to check whether the predetermined quantity of consecutive characters exist in a current storage address corresponding to the current hash value obtained by the hash value calculating subunit, where the current hash value and the current storage address conform to the predetermined correspondence; and a first determining unit 1223, configured to, if yes, determine that the detected feature information in the packet conforms to a classification characteristic of one rule group among the plurality of preset rule groups; and if no, determine that the detected feature information in the packet conforms to a classification characteristic of no preset rule group.

The first grouping unit 123 in the embodiment is further configured to: when a plurality of distinctive features exists in the one or more rules, select the predetermined quantity of consecutive characters in one distinctive feature among the plurality of distinctive features as a keyword of the rule group, where the number of keywords stored in a storage space corresponding to an offset of the selected one distinctive feature is as small as possible, compared with keywords stored in storage spaces corresponding to offsets in other distinctive features than the one distinctive feature among the plurality of distinctive features.

Embodiment 6

Figure 14:
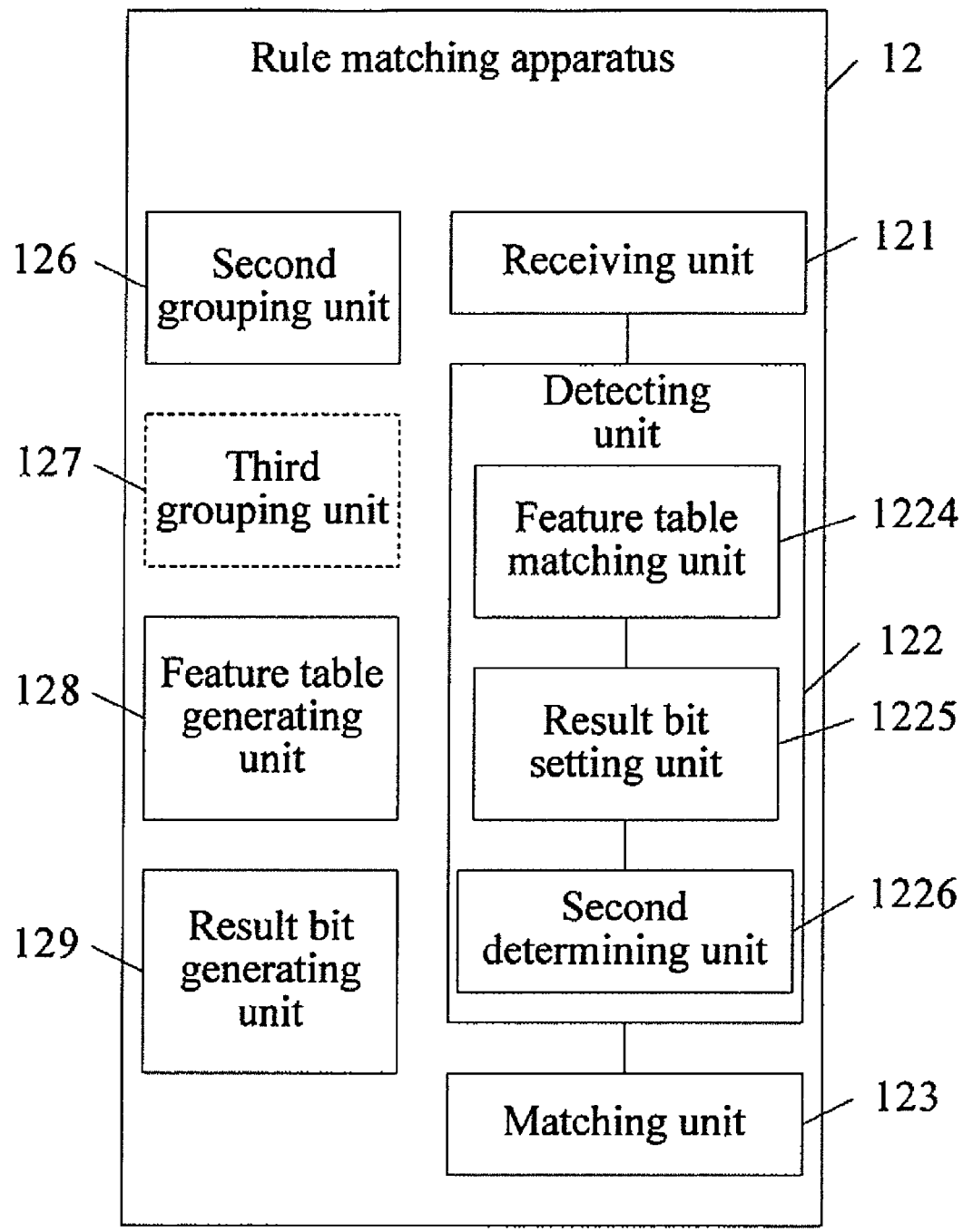
FIG. 14 is a structural diagram of still another rule matching apparatus according to Embodiment 6 of the present invention.

Based on Embodiment 4, as shown in FIG. 14, the rule matching apparatus in this embodiment further includes a second grouping unit 126, configured to group one or more rules with as many same characters as possible starting from a same offset into one group.

The rule matching apparatus in this embodiment further includes a third grouping unit 127, configured to group rules according to whether the rules are of a protocol type and/or whether the rules are hot rules, to obtain one or more rule sets, where one rule set includes one or more rules; and group one or more rules with as many same characters as possible starting from a same offset in rules included in each rule set into one group.

The foregoing two grouping units are in a parallel relationship, that is, only one grouping unit may be included. Both units may be implemented based on an existing compiler.

The rule matching apparatus in this embodiment may further include:

a feature table generating unit 128, configured to generate a feature table corresponding to each rule group, where the feature table includes a plurality of two-dimensional entries and each two-dimensional entry includes an offset and a character; when a rule in the rule group has a specific character at a specific offset, set a value of a two-dimensional entry corresponding to the specific offset and the specific character to a valid value; and when no rule in the rule group has a specific character at a specific offset, set a value of a two-dimensional entry corresponding to the specific offset and the specific character to an invalid value, where this unit may be implemented based on an existing compiler; and a result bit generating unit 129, configured to generate a result bit corresponding to each rule group.

The detecting unit 122 includes:

a feature table matching unit 1224, configured to match each character at each offset in the packet with the two-dimensional entries in the feature table corresponding to each rule group; if a value of a two-dimensional entry that includes a current offset and a current character is valid, the matching succeeds; and otherwise, the matching fails;

a result bit setting unit 1225, configured to, when matching is performed for the first time, set a value of a result bit generated by the result bit generating unit corresponding to the rule group for matching to a value of the matching result, where the matching result is 1 when the feature table matching unit determines that the matching succeeds, and the matching result is 0 when the feature table matching unit determines that the matching fails; and when matching is performed not for the first time, update the value of the result bit corresponding to the rule group for matching, where an updated value is a value obtained by performing an "AND" operation on a previous value and the matching result; and a second determining unit 1226, configured to determine, when the result bit is finally 1 after the processing by the result bit setting unit, that the feature information in the packet conforms to a classification characteristic of one rule group among the plurality of preset rule groups; and when the result bit is finally 0, determine that the feature information in the packet conforms to a classification characteristic of no preset rule group.

Based on the foregoing Embodiments 4 to 6, the on-chip memory includes a static on-chip memory and a cache, where content in the static on-chip memory is not updated during program running, and content in the cache is updated during program running.

Figure 15:
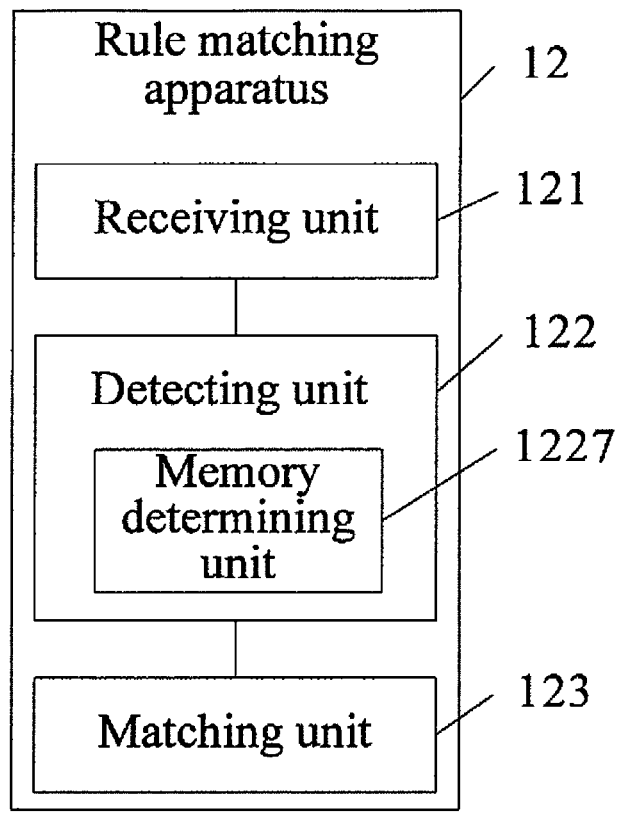
FIG. 15 is a structural diagram of yet still another rule matching apparatus according to Embodiment 6 of the present invention.

The detecting unit 122 in the rule matching apparatus shown in FIG. 15 includes:

a memory determining unit 1227, configured to determine whether the first state machine is stored in the static on-chip memory; if yes, determine that the first state machine is stored in the on-chip memory; and if no, further determine whether the first state machine is stored in the cache, and if yes, determine that the first state machine is stored in the on-chip memory; and otherwise, determine that the first state machine is stored in the off-chip memory.

In addition, the matching unit based on the foregoing Embodiments 4 to 6 uses the first state machine to match the packet based on a multithread technology.

The foregoing apparatuses may achieve corresponding beneficial effects in the method embodiments. For description of specific steps of the units, reference may be made to the corresponding embodiments and details are not described herein again. To achieve better performance, a hardware processor such as an FPGA is adopted in this embodiment for processing; and a person skilled in the art may use other similar processors for implementation according to actual performance requirements, for which details are not described herein.

Embodiment 7

Figure 16:
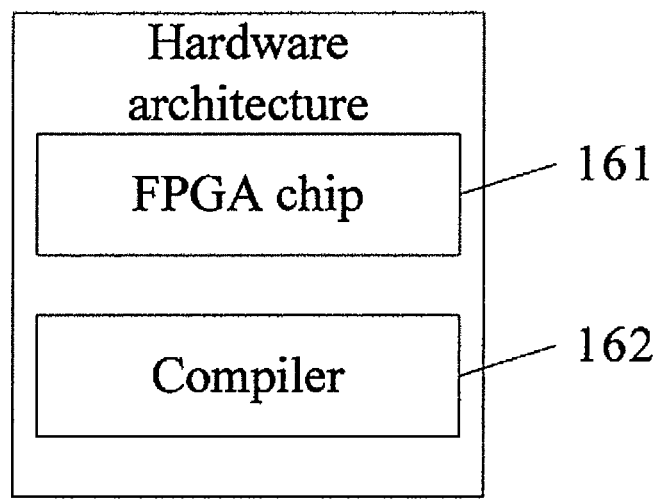
FIG. 16 is a structural diagram of a hardware architecture according to Embodiment 7 of the present invention.

Based on the foregoing embodiments, this embodiment describes a typical hardware architecture to implement the methods and functional modules described in the foregoing embodiments. As shown in FIG. 16, the hardware architecture includes:

an FPGA chip 161 and a compiler 162.

The FPGA chip 161 is configured to complete processing functions during running;

The compiler 162 is mainly configured to complete grouping, compiling, and generation of data required for running (for example, generation of the feature table and keyword storage described in the foregoing embodiments).

The compiler may be implemented based on an existing compiler (generally software is used for processing), that is, some software functional modules are added to the existing compiler to implement the method processes and functional modules required in the embodiments. These technologies are technologies commonly known to persons skilled in the art, which are not described herein.

It may be clearly understood by a person skilled in the art that, for the purpose of convenient and brief description, the foregoing division of functional modules is provided as a mere example for description. In actual applications, the foregoing functions may be distributed to and completed by different functional modules according to requirements, that is, the internal structure of the apparatus is divided into different functional modules to complete all or part of the foregoing functions. For detailed working processes of the foregoing system, apparatuses, and units, reference may be made to corresponding processes in the foregoing method embodiments, and details are not described herein again.

In the several embodiments provided in the present application, it should be understood that the disclosed system, apparatuses, and methods may be implemented in other manners. For example, the described apparatus embodiments are merely exemplary. For example, the division of modules or units is merely a division of logical functions and there may be other divisions in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may be or not be physically separate, and parts displayed as units may be or not be physical units, and may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions which enable a computer device (which may be a personal computer, a server, or a network device) or a processor to perform all or a part of the steps of the methods described in the embodiments of the present invention. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A rule matching method performed by a network device for performing deep packet inspection, the method comprising:

receiving a packet;

detecting feature information in content of the packet;

determining whether the detected feature information in the packet conforms to a classification characteristic of one rule group among a plurality of preset rule groups, wherein each rule group in the plurality of rule groups is obtained by grouping one or more rules according to a predetermined classification characteristic, and each rule group after compiling corresponds to a respective state machine compiled from the corresponding rule group, wherein at least one of the respective state machines matches the packet, wherein a state machine of the respective state machines that commonly matches a packet is stored in an on-chip memory with a relatively high read/write speed, and other state machines of the respective state machines are stored in an off-chip memory with a relatively low read/write speed; and when the detected feature information conforms to a classification characteristic of one rule group among the plurality of preset rule groups, then:
- determining a state machine of the respective state machines corresponding to the one rule group as a first state machine;
- determining whether the first state machine is stored in the on-chip memory;
- when the first state machine is stored in the off-chip memory, loading the first state machine from the off-chip memory into the on-chip memory; and
- using the first state machine to match the packet to obtain a matching result.

2. The method according to claim 1, wherein grouping according to a predetermined classification characteristic comprises:
- determining a distinctive feature of each rule in one or more rules so that as many other rules without the distinctive feature as possible exist in the one or more rules, and grouping rules with a same distinctive feature into one group, wherein the distinctive feature is one or more consecutive characters with a predetermined quantity starting from an offset.

3. The method according to claim 2, further comprising:
- selecting a predetermined quantity of consecutive characters in the distinctive feature as a keyword of the rule group, and storing the keyword in a storage space corresponding to the offset; and
- performing a hash operation on the keyword of the rule group to obtain a predetermined hash value corresponding to the rule group, and storing the keyword in a storage address corresponding to the predetermined hash value, wherein the predetermined hash value and the storage address conform to a predetermined correspondence; and wherein detecting feature information in content of the packet, and determining whether the detected feature information in the packet conforms to a classification characteristic of one rule group among a plurality of preset rule groups comprises:
- calculating a current hash value of the predetermined quantity of consecutive characters on each offset in the packet,
- checking whether the predetermined quantity of consecutive characters exist in a current storage address corresponding to the current hash value, wherein the current hash value and the current storage address conform to the predetermined correspondence,
- if the predetermined quantity of consecutive characters exist in the current storage address corresponding to the current hash value, determining that the detected feature information in the packet conforms to a classification characteristic of one rule group among the plurality of preset rule groups, and
- if the predetermined quantity of consecutive characters do not exist in the current storage address corresponding to the current hash value, determining that the detected feature information in the packet conforms to a classification characteristic of no preset rule group.

4. The method according to claim 3, further comprising:
- when a plurality of distinctive features exists in one or more rules, selecting the predetermined quantity of consecutive characters in one distinctive feature among the plurality of distinctive features as a keyword of the rule group, wherein the number of keywords stored in a storage space corresponding to an offset of the selected one distinctive feature is as small as possible, compared with keywords stored in storage spaces corresponding to offsets of other distinctive features than the one distinctive feature among the plurality of distinctive features.

5. The method according to claim 1, wherein grouping according to a predetermined classification characteristic comprises:
- grouping one or more rules with as many same characters as possible starting from a same offset into one group.

6. The method according to claim 1, wherein grouping according to a predetermined classification characteristic comprises:
- grouping rules according to whether the rules are of a protocol type and/or whether the rules are hot rules, to obtain one or more rule sets, wherein one rule set comprises one or more rules; and
- grouping one or more rules with as many same characters as possible starting from a same offset in rules comprised in each rule set into one group.

7. The method according to claim 5, wherein the method further comprises:
- generating a feature table corresponding to each rule group, wherein the feature table comprises a plurality of two-dimensional entries and each two-dimensional entry comprises an offset and a character; when a rule in the rule group has a specific character at a specific offset, setting a value of a two-dimensional entry corresponding to the specific offset and the specific character to a valid value; and when no rule in the rule group has a specific character at a specific offset, setting a value of a two-dimensional entry corresponding to the specific offset and the specific character to an invalid value;
- generating a result bit corresponding to each rule group; and
- the detecting feature information in content of the packet, and determining whether the detected feature information in the packet conforms to a classification characteristic of one rule group among a plurality of preset rule groups comprises:
- matching each character at each offset in the packet with the two-dimensional entries in the feature table corresponding to each rule group; if a value of a two-dimensional entry comprising a current offset and a current character is valid, the matching succeeds; and a value of a two-dimensional entry comprising a current offset and a current character is invalid, the matching fails;
- when matching is performed for the first time, setting a value of a result bit corresponding to the rule group for matching to a value of the matching result, wherein the matching result is 1 when the matching succeeds, and the matching result is 0 when the matching fails; and
- when matching is performed not for the first time, updating the value of the result bit corresponding to the rule group for matching, wherein an updated value is a value obtained by performing an "AND" operation on a previous value and the matching result;

when the result bit is finally 1, determining that the feature information in the packet conforms to a classification characteristic of one rule group among the plurality of preset rule groups; and when the result bit is finally 0, determining that the feature information in the packet conforms to a classification characteristic of no preset rule group.

8. The method according to claim 6, wherein the method further comprises:

generating a feature table corresponding to each rule group, wherein the feature table comprises a plurality of two-dimensional entries and each two-dimensional entry comprises an offset and a character; when a rule in the rule group has a specific character at a specific offset, setting a value of a two-dimensional entry corresponding to the specific offset and the specific character to a valid value; and when no rule in the rule group has a specific character at a specific offset, setting a value of a two-dimensional entry corresponding to the specific offset and the specific character to an invalid value;

generating a result bit corresponding to each rule group; and wherein detecting feature information in content of the packet, and determining whether the detected feature information in the packet conforms to a classification characteristic of one rule group among a plurality of preset rule groups comprises:

matching each character at each offset in the packet with the two-dimensional entries in the feature table corresponding to each rule group; if a value of a two-dimensional entry comprising a current offset and a current character is valid, the matching succeeds; and a value of a two-dimensional entry comprising a current offset and a current character is invalid, the matching fails, when matching is performed for the first time, setting a value of a result bit corresponding to the rule group for matching to a value of the matching result, wherein the matching result is 1 when the matching succeeds, and the matching result is 0 when the matching fails; and when matching is performed not for the first time, updating the value of the result bit corresponding to the rule group for matching, wherein an updated value is a value obtained by performing an "AND" operation on a previous value and the matching result, when the result bit is finally 1, determining that the feature information in the packet conforms to a classification characteristic of one rule group among the plurality of preset rule groups, and when the result bit is finally 0, determining that the feature information in the packet conforms to a classification characteristic of no preset rule group.

9. The method according to claim 1, wherein:

the on-chip memory comprises a static on-chip memory and a cache, content in the static on-chip memory is not updated during program running, and content in the cache is updated during program running; and determining whether the first state machine is stored in the on-chip memory comprises:

determining whether the first state machine is stored in the static on-chip memory, and if the first state machine is stored in the static on-chip memory, determining that the first state machine is stored in the on-chip memory, and if the first state machine is not stored in the static on-chip memory, further determining whether the first state machine is stored in the cache, and if the first state machine is stored in the cache, determining that the first state machine is stored in the on-chip memory; and if the first state machine is not stored in the cache, determining that the first state machine is stored in the off-chip memory.

10. The method according to claim 1, wherein using the first state machine to match the packet comprises: using the first state machine to match the packet based on a multi-thread technology.

11. A rule matching apparatus in a network device for performing deep packet inspection, the apparatus comprising:

a receiving unit, configured to receive a packet;

a detecting unit, configured to detect feature information in the packet received by the receiving unit, and determine whether the detected feature information in the packet conforms to a classification characteristic of one rule group among a plurality of preset rule groups, and send a detection result to a matching unit, wherein there are a plurality of rule groups which are obtained by grouping one or more rules according to predetermined classification characteristics, and each rule group after compiling corresponds to one state machine compiled from the corresponding rule group and one state machine identifier, wherein at least one of the corresponding the state machines matches the packet, wherein a state machine of the corresponding state machines that commonly matches a packet is stored in an on-chip memory with a relatively high read/write speed, and other state machines of the corresponding state machines are stored in an off-chip memory with a relatively low read/write speed; and the matching unit, configured to determine, when it is learned from the detection result sent by the detecting unit that the feature information detected by the detecting unit conforms to a classification characteristic of one rule group among the plurality of preset rule groups, a state machine corresponding to the one rule group as a first state machine of the corresponding state machines; and determine whether the first state machine is stored in the on-chip memory, and if the first state machine is stored in the on-chip memory, use the first state machine to match the packet to obtain a matching result; and if the first state machine is not stored in the on-chip memory, when the off-chip memory stores the first state machine, load the first state machine from the off-chip memory into the on-chip memory and use the first state machine to match the packet to obtain a matching result.

12. The apparatus according to claim 11, further comprising a first grouping unit, wherein the first grouping unit is configured to:

determine a distinctive feature of each rule in one or more rules so that as many other rules without the distinctive feature as possible exist in the one or more rules, and group rules with a same distinctive feature into one group, wherein the distinctive feature is one or more consecutive characters with a predetermined quantity starting from an offset.

13. The apparatus according to claim 12, further comprising:

a keyword processing unit, configured to select a predetermined quantity of consecutive characters in the distinctive feature as a keyword of the rule group and store the keyword in a storage space corresponding to the offset; and a hash value calculating unit, configured to perform a hash operation on the keyword of the rule group obtained by the keyword processing unit by processing, to obtain a predetermined hash value corresponding to the rule group, and store the keyword in a storage address corresponding to the predetermined hash value, wherein the predetermined hash value and the storage address conform to a predetermined correspondence;

wherein the detecting unit comprises:

a hash value calculating subunit, configured to calculate a current hash value of the predetermined quantity of consecutive characters on each offset in the packet, a searching unit, configured to check whether the predetermined quantity of consecutive characters exist in a current storage address corresponding to the current hash value obtained by the hash value calculating subunit, wherein the current hash value and the current storage address conform to the predetermined correspondence, and a first determining unit, configured to, if the predetermined quantity of consecutive characters exist in the current storage address corresponding to the current hash value obtained by the hash value calculating subunit, determine that the detected feature information in the packet conforms to a classification characteristic of one rule group among the plurality of preset rule groups; and if the predetermined quantity of consecutive characters do not exist in the current storage address corresponding to the current hash value obtained by the hash value calculating subunit, determine that the detected feature information in the packet conforms to a classification characteristic of no preset rule group.

14. The apparatus according to claim 13, wherein the first grouping unit is further configured to, when a plurality of distinctive features exist in one or more rules, select the predetermined quantity of consecutive characters in one distinctive feature among the plurality of distinctive features as a keyword of the rule group, wherein the number of keywords stored in a storage space corresponding to an offset of the selected one distinctive feature is as small as possible, compared with keywords stored in storage spaces corresponding to offsets in other distinctive features than the one distinctive feature among the plurality of distinctive features.

15. The apparatus according to claim 11, further comprising a second grouping unit, configured to group one or more rules with as many same characters as possible starting from a same offset into one group.

16. The apparatus according to claim 11, further comprising a third grouping unit, configured to: group rules according to whether the rules are of a protocol type and/or whether the rules are hot rules, to obtain one or more rule sets, wherein one rule set comprises one or more rules; and group one or more rules with as many same characters as possible starting from a same offset in rules comprised in each rule set into one group.

17. The apparatus according to claim 15, further comprising:

a feature table generating unit, configured to generate a feature table corresponding to each rule group, wherein the feature table comprises a plurality of two-dimensional entries and each two-dimensional entry comprises an offset and a character; when a rule in the rule group has a specific character at a specific offset, set a value of a two-dimensional entry corresponding to the specific offset and the specific character to a valid value; and when no rule in the rule group has a specific character at a specific offset, set a value of a two-dimensional entry corresponding to the specific offset and the specific character to an invalid value;

a result bit generating unit, configured to generate a result bit corresponding to each rule group; and wherein the detecting unit comprises:

a feature table matching unit, configured to match each character at each offset in the packet with the two-dimensional entries in the feature table corresponding to each rule group; if a value of a two-dimensional entry comprising a current offset and a current character is valid, the matching succeeds; and otherwise, the matching fails, a result bit setting unit, configured to, when matching is performed for the first time, set a value of a result bit generated by the result bit generating unit corresponding to the rule group for matching to a value of the matching result, wherein the matching result is 1 when the feature table matching unit determines that the matching succeeds, and the matching result is 0 when the feature table matching unit determines that the matching fails; and when matching is performed not for the first time, update the value of the result bit corresponding to the rule group for matching, wherein an updated value is a value obtained by performing an "AND" operation on a previous value and the matching result, and a second determining unit, configured to determine, when the result bit is finally 1 after the processing by the result bit setting unit, that the feature information in the packet conforms to a classification characteristic of one rule group among the plurality of preset rule groups; and when the result bit is finally 0, determine that the feature information in the packet conforms to a classification characteristic of no preset rule group.

18. The apparatus according to claim 16, further comprising:

a feature table generating unit, configured to generate a feature table corresponding to each rule group, wherein the feature table comprises a plurality of two-dimensional entries and each two-dimensional entry comprises an offset and a character; when a rule in the rule group has a specific character at a specific offset, set a value of a two-dimensional entry corresponding to the specific offset and the specific character to a valid value; and when no rule in the rule group has a specific character at a specific offset, set a value of a two-dimensional entry corresponding to the specific offset and the specific character to an invalid value;

a result bit generating unit, configured to generate a result bit corresponding to each rule group; and wherein the detecting unit comprises:

a feature table matching unit, configured to match each character at each offset in the packet with the two-dimensional entries in the feature table corresponding to each rule group; if a value of a two-dimensional entry comprising a current offset and a current character is valid, the matching succeeds; and otherwise, the matching fails, a result bit setting unit, configured to, when matching is performed for the first time, set a value of a result bit generated by the result bit generating unit corresponding to the rule group for matching to a value of the matching result, wherein the matching result is 1 when the feature table matching unit determines that the matching succeeds, and the matching result is 0 when the feature table matching unit determines that the matching fails; and when matching is performed not for the first time, update the value of the result bit corresponding to the rule group for matching, wherein an updated value is a value obtained by performing an "AND" operation on a previous value and the matching result, and a second determining unit, configured to determine, when the result bit is finally 1 after the processing by the result bit setting unit, that the feature information in the packet conforms to a classification characteristic of one rule group among the plurality of preset rule groups; and when the result bit is finally 0, determine that the feature information in the packet conforms to a classification characteristic of no preset rule group.

19. The apparatus according to claim 11, wherein the on-chip memory comprises a static on-chip memory and a cache, content in the static on-chip memory is not updated during program running, and content in the cache is updated during program running; and the detecting unit comprises:
a memory determining unit, configured to determine whether the first state machine is stored in the static on-chip memory, and if the first state machine is stored in the static on-chip memory, determine that the first state machine is stored in the on-chip memory; and if the first state machine is not stored in the static on-chip memory, further determine whether the first state machine is stored in the cache, and if the first state machine is stored in the cache, determine that the first state machine is stored in the on-chip memory; and if the first state machine is not stored in the cache, determine that the first state machine is stored in the off-chip memory.

20. The apparatus according to claim 11, wherein the matching unit uses the first state machine to match the packet based on a multithread technology.

* * * * *